United States Patent
Mayers et al.

(10) Patent No.: US 11,693,898 B2
(45) Date of Patent: Jul. 4, 2023

(54) SYSTEM AND METHOD FOR DETERMINING A FILE FOR AN INTERACTION WITH A WEARABLE DEVICE BASED ON UTILITY INDICATORS

(71) Applicant: Bank of America Corporation, Charlotte, NC (US)

(72) Inventors: Kyle A. Mayers, Charlotte, NC (US); George Anthony Albero, Charlotte, NC (US); Jinna Zevulun Kim, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 97 days.

(21) Appl. No.: 17/375,900

(22) Filed: Jul. 14, 2021

(65) Prior Publication Data

US 2023/0015067 A1    Jan. 19, 2023

(51) Int. Cl.
| | | |
|---|---|---|
| *G06F 16/535* | (2019.01) | |
| *G06F 16/538* | (2019.01) | |
| *G06F 16/587* | (2019.01) | |
| *G06F 9/30* | (2018.01) | |
| *G06F 1/16* | (2006.01) | |

(52) U.S. Cl.
CPC ........... *G06F 16/535* (2019.01); *G06F 1/163* (2013.01); *G06F 9/30036* (2013.01); *G06F 16/538* (2019.01); *G06F 16/587* (2019.01)

(58) Field of Classification Search
CPC ..... G06F 16/535; G06F 16/538; G06F 16/587
USPC ........................................................ 707/722
See application file for complete search history.

(56) References Cited

U.S. PATENT DOCUMENTS

| | | |
|---|---|---|
| 1,097,701 A | 5/1914 | Grace |
| 9,105,039 B2 | 8/2015 | Kramer et al. |
| 9,330,389 B2 | 5/2016 | Pitroda et al. |
| 9,390,415 B2 | 7/2016 | Hanson et al. |
| 9,536,197 B1 | 1/2017 | Penilla et al. |
| 9,648,107 B1 | 5/2017 | Penilla et al. |
| 9,721,268 B2 | 8/2017 | Bondesen et al. |
| 9,799,047 B2 | 10/2017 | Goldfinger et al. |
| 9,916,010 B2 | 3/2018 | Harris et al. |
| 9,928,547 B2 | 3/2018 | Del Vecchio et al. |
| 10,096,037 B2 | 10/2018 | Butler, IV et al. |
| 10,223,710 B2 | 3/2019 | Purves et al. |
| 10,438,206 B2 | 10/2019 | Jivraj et al. |
| 10,445,715 B2 | 10/2019 | Granbery et al. |
| 10,482,478 B2 | 11/2019 | Tietzen et al. |

(Continued)

*Primary Examiner* — Kimberly L Wilson

(57) ABSTRACT

A system for query processing of a frequency of utility indicators comprises a processor operable to receive a transmission from a first wearable device comprising entity file information associated with a first entity. The processor is operable to generate a file vector comprising one or more files of a digital folder based on an association with one or more utility indicators and determine that one of the files corresponds to a greater number of the one or more utility indicators than the remaining files based, at least in part, on the entity file information. The processor is operable to assign the determined one of the one or more files as a first file within the file vector and send a transmission to the first wearable device comprising the file vector and an indication to utilize the first file in an interaction between the first user and the first entity.

20 Claims, 3 Drawing Sheets

(56) References Cited

U.S. PATENT DOCUMENTS

| | | |
|---|---|---|
| 10,552,860 B2 | 2/2020 | Logsdon |
| 10,555,112 B2 | 2/2020 | Williams |
| 10,586,227 B2 | 3/2020 | Makhdumi et al. |
| 10,628,843 B2 | 4/2020 | Bell et al. |
| 10,685,379 B2 | 6/2020 | Purves et al. |
| 2012/0232968 A1* | 9/2012 | Caiman ............... G06Q 20/322 705/14.4 |
| 2012/0232976 A1 | 9/2012 | Calman et al. |
| 2012/0232977 A1 | 9/2012 | Calman et al. |
| 2014/0207680 A1 | 7/2014 | Rephlo |
| 2014/0244514 A1 | 8/2014 | Rodriguez et al. |
| 2015/0007307 A1 | 1/2015 | Grimes et al. |
| 2015/0084745 A1 | 3/2015 | Hertz et al. |
| 2015/0154634 A1 | 6/2015 | Chiu et al. |
| 2015/0227925 A1 | 8/2015 | Filler |
| 2015/0228004 A1 | 8/2015 | Bednarek et al. |
| 2015/0371255 A1* | 12/2015 | Rebikov ............ G06Q 30/0225 705/14.26 |
| 2016/0180386 A1 | 6/2016 | Konig |
| 2017/0039599 A1 | 2/2017 | Tunnell et al. |
| 2017/0091765 A1 | 3/2017 | Lloyd et al. |
| 2017/0178526 A1 | 6/2017 | Grimes et al. |
| 2018/0276710 A1 | 9/2018 | Tietzen et al. |
| 2018/0345129 A1 | 12/2018 | Rathod |
| 2019/0073644 A1 | 3/2019 | Isaacson et al. |
| 2019/0107935 A1 | 4/2019 | Spivack et al. |
| 2019/0392452 A1 | 12/2019 | Jivraj et al. |
| 2020/0111133 A1 | 4/2020 | Georgoff et al. |
| 2020/0118400 A1 | 4/2020 | Zalewski et al. |
| 2020/0327538 A1 | 10/2020 | Shrivastava |
| 2021/0019786 A1 | 1/2021 | Kramer et al. |
| 2021/0035145 A1* | 2/2021 | Walsh ................ G06Q 30/0225 |
| 2021/0383350 A1* | 12/2021 | Hammock ............ G06Q 30/06 |
| 2022/0309557 A1* | 9/2022 | Donnels ............ G06Q 30/0631 |

\* cited by examiner

SYSTEM AND METHOD FOR DETERMINING A FILE FOR AN INTERACTION WITH A WEARABLE DEVICE BASED ON UTILITY INDICATORS

TECHNICAL FIELD

The present disclosure relates generally to determining a file for an interaction through a wearable device. More particularly, in certain embodiments, the present disclosure is related to a system and method for query processing of a frequency of utility indicators.

BACKGROUND

A plurality of files of a user can be stored electronically in a digital folder within an external system. A user can access these files through a user device. In conducting an interaction with an entity, the user is not able to analyze the plurality of files to determine which one of the plurality of files provides a greater value of utility to the user than the remaining files in the interaction with the entity.

SUMMARY

Previous technology used for analyzing a plurality of files associated with a user suffers from disadvantages. For example, previous technology can be inefficient and provides little or no insights into the relative importance of a given file for meeting the needs of users, organizations, businesses, working groups, or the like. Previous technology is unable to automatically identify an optimal file that provides a greater value of a received benefit to a user in comparison to the remaining files in the context of conducting an interaction with an entity. In this example, this disclosure recognizes that the plurality of files may be stored in a digital folder within an external system, where the user may access a portion of the digital folder remotely through a wearable device. The wearable device may not have enough resources to store the entirety of the plurality of files of the digital folder. Further, when conducting an interaction with an entity, the user may not know which one of the plurality of files to utilize in order to optimize a maximum value in a received benefit. This can result in an opportunity loss for the user to maximize a received benefit when conducting an interaction with an entity. Previous technology lacks the ability to determine which file for the user to utilize in an interaction with the entity based on entity file information and to display that file to the user via the wearable device.

Certain embodiments of this disclosure provide unique solutions to technical problems of previous technology, including those problems identified above, by providing tools for reliably and efficiently determining relative prioritizations for different interactions between users and entities, for example, such that the user can maximize a received benefit when conducting an interaction with an entity. For example, the disclosed system provides several technical advantages over previous technology, which include: (1) technology for generating and transmitting file vectors and entity vectors for display through a wearable device, where the wearable device is configured to conserve computer resources, and usage is more efficient, as the processing is done external to the wearable device; (2) technology for analyzing a plurality of files to determine an optimal file to use in an interaction, where such an analysis is modified each time based on received entity file information; and (3) facilitating the analysis of possible entities available for an interaction with the user based on geolocation information, where the analysis is more effective to the user through visual representation. As such, this disclosure may improve the function of computer systems used to help manage a plurality of files and associated hardware infrastructures, such that, for example, the appropriate hardware or user action (e.g., processing, memory, and networking resources) can be made available for other prioritized operations.

In general, computer resources and bandwidth of previous technology have not been allocated to analyze a plurality of files stored in a digital folder to identify an optimal file to be used by a user in an interaction with an entity. The disclosed server may improve the usage of computer resources by identifying the optimal file through systems and methods not previously utilized by conventional processes and technologies. Further, the identification may be performed on an individual basis per entity.

As such, this disclosure may improve the function of computing systems used for query processing of a frequency of utility indicators. The disclosed system may be integrated into a practical application of generating an entity vector and file vector for transmission and display to the user through a wearable device, wherein the user may conduct an interaction after visually processing the displayed entity vector and file vector. The system improves efficiency by generating the vectors at an external system and increasing availability of the processing resources of the wearable device for other operations.

The disclosed system may further be integrated into an additional practical application of improving underlying operations of computing systems tasked to oversee digital folders of one or more users. For example, the disclosed system may reduce processing, memory, and time resources of a wearable device for identifying an optimal file to be used within each digital folder for each potential interaction. The wearable device may provide the needed entity file information to the server and then may receive a sorted vector with an indication of which file to utilize.

In an embodiment, a system for query processing of a frequency of utility indicators comprises a memory operable to store a digital folder associated with a first user, wherein the digital folder comprises a database of one or more files associated with the first user. The system further comprises a processor operably coupled to the memory for analyzing or parsing through one or more files stored in the memory, configured to receive a transmission from a first wearable device associated with the first user comprising entity file information associated with a first entity. The processor is further operable to generate a file vector comprising at least a portion of the one or more files of the digital folder based on an association with one or more utility indicators and determine that one of the one or more files within the file vector corresponds to a greater number of the one or more utility indicators than a remaining one or more files based, at least in part, on the entity file information. The processor is further operable to assign the determined one of the one or more files as a first file within the file vector and send a transmission to the first wearable device comprising the file vector and an indication to utilize the first file in an interaction between the first user and the first entity.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
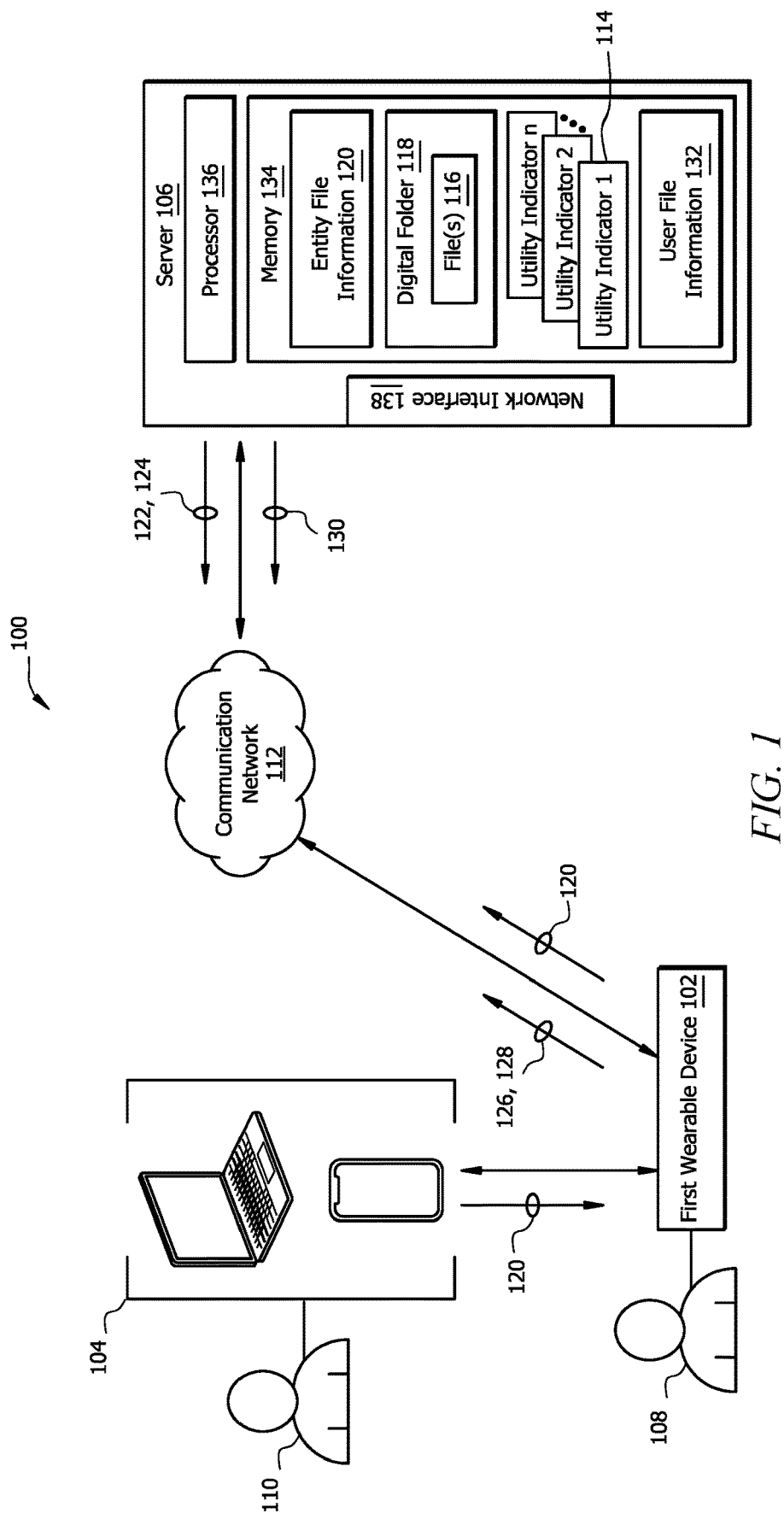
FIG. 1 is a schematic diagram of an example system for query processing of a frequency of utility indicators.
Figure 2:
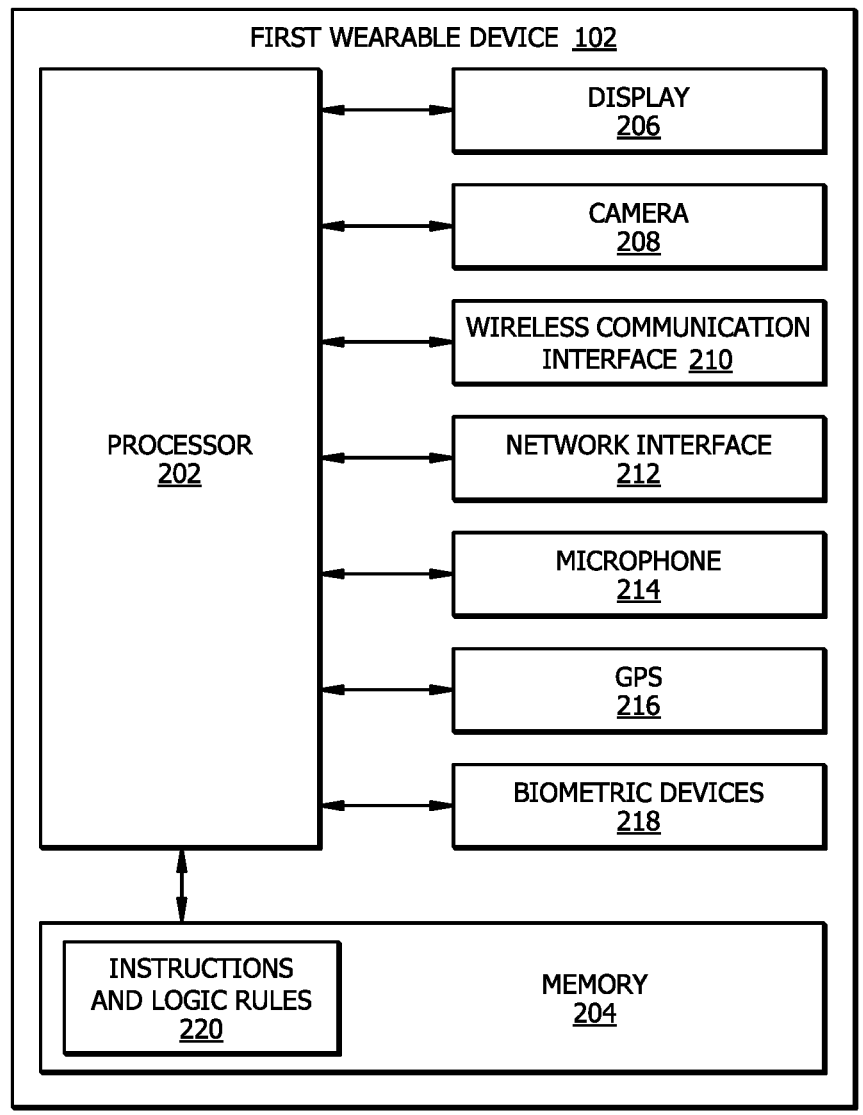
FIG. 2 is a block diagram of an example wearable device of the system of FIG. 1.
Figure 3:
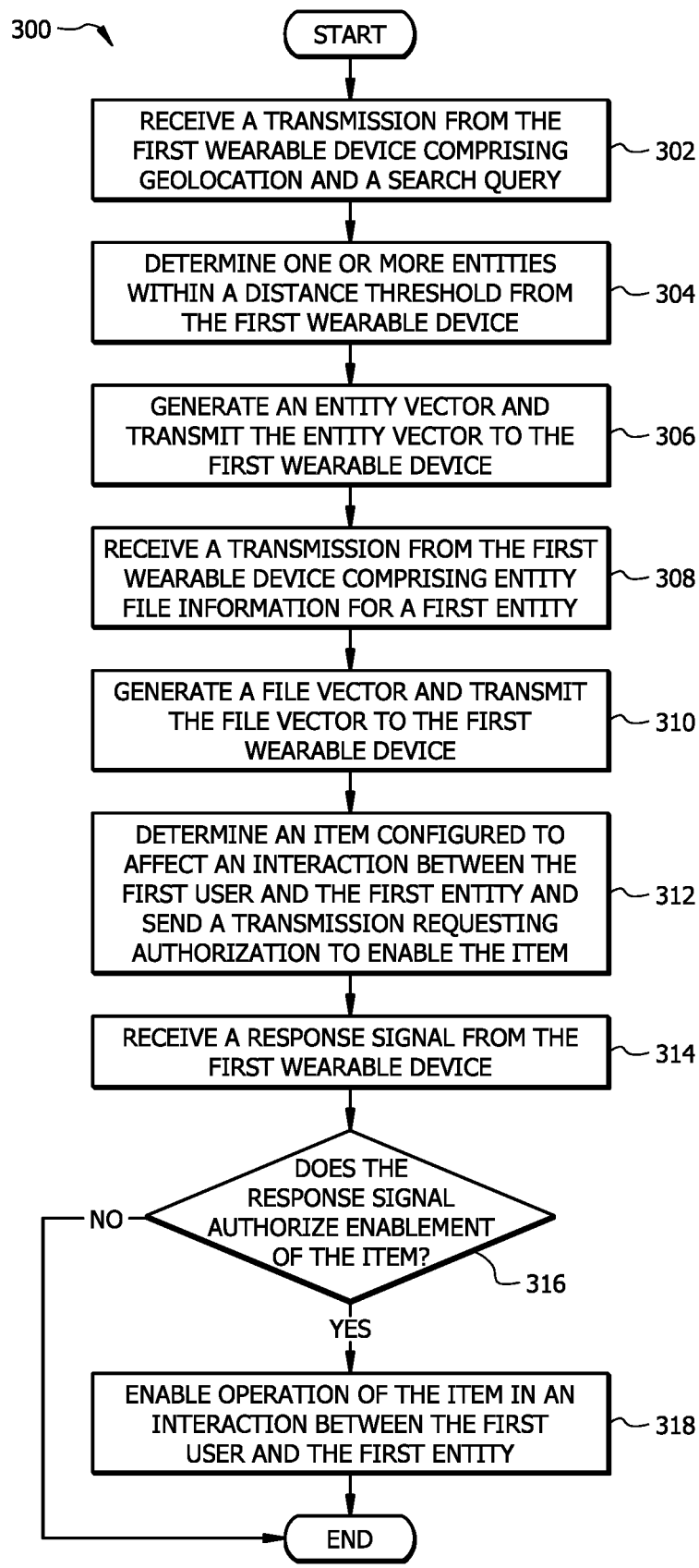
FIG. 3 is a flow diagram illustrating an example operation of the system of FIG. 1.

This disclosure provides solutions to the aforementioned and other problems of previous technology through query processing of a frequency of utility indicators. FIG. 1 is a schematic diagram of an example system for query processing of a frequency of utility indicators. FIG. 2 is a block diagram of an example wearable device of the system of FIG. 1. FIG. 3 is a flow diagram illustrating an example operation of the system of FIG. 1.

Example System for Query Processing of a Frequency of Utility Indicators FIG. 1 illustrates a schematic diagram of an example system 100 for query processing of a frequency of utility indicators. The system 100 may include a first wearable device 102, a first entity device 104, and a server 106, wherein a first user 108 is associated with the first wearable device 102, and wherein a first entity 110 is associated with the first entity device 104. The system 100 may be communicatively coupled to a communication network 112 and may be operable to transmit data between the first wearable device 102, first entity device 104, and the server 106 through the communication network 112. In general, the server 106 may perform an identification process with the first wearable device 102. In particular embodiments, this process uses one or more utility indicators 114 to determine which one of one or more files 116 contained within a digital folder 118, associated with the first user 108, for the first user 108 to utilize in an interaction with the first entity 110. The determined one of the one or more files 116 may be transmitted to the first wearable device 102 to be displayed for the first user 108. In further embodiments, the server 106 may operate based, at least in part, on geolocation information provided by the first wearable device 102.

For example, in a particular embodiment, the first user 108 may be attempting to conduct an interaction with the first entity 110 via the first entity device 104. In this example, the first wearable device 102 may receive entity file information 120 associated with the first entity 110 from the first entity device 104. The first wearable device 102 may be communicatively coupled to the first entity device 104. The first wearable device 102 may establish a peer-to-peer connection with the first entity device 104 through near field communications (NFC), Bluetooth, Wi-Fi, or combinations thereof. In another embodiment, the first wearable device 102 may be operable to scan an identification item near the first entity device 104 to receive the entity file information 120 associated with the first entity 110, wherein the identification item is at least one of a barcode, a Quick Response (QR) code, a coded image, or a coded text. The first wearable device 102 may transmit the entity file information 120 to the server 106 in order for the server 106 to determine which one of one or more files 116, associated with the first user 108, for the first user 108 to utilize in the interaction with the first entity 110. The server 106 may be operable to generate a file vector 122 based on the one or more utility indicators 114 stored in the server 106 and on the received entity file information 120. The server 106 may sort the file vector 122 and determine which one of one or more files 116 to be utilized by the first user 108. The server 106 may transmit the file vector 122 and an indication 124 to utilize the first file assigned in the file vector 122 in an interaction between the first user 108 and the first entity 110.

In one embodiment, the first user 108 may be about to conduct an interaction at a coffee shop, such as purchasing a cup of coffee. The first wearable device 102 may identify a QR code near the first entity device 104 and scan the QR code to receive entity file information 120 associated with the coffee shop. The server 106 may receive the entity file information 120 from the first wearable device 102 and identify the entity as a coffee shop. The server 106 may then sort through and compare different accounts stored as files 116 in the digital folder 118 to determine which one the first user 108 should use to maximize a received benefit from conducting an interaction with the coffee shop. For example, there may be a first card account stored in the digital folder 118 that provides for 1% value back on all interactions and a second card account that provides for 1.5% value back on all interactions and an additional 1% value back on all interactions related to food/beverages. The server 106 may then indicate to the first user 108 that the first user 108 would receive a maximum value back on the transaction if the second card account is used to purchase the cup of coffee from the coffee shop.

In further embodiments, the server 106 may be operable to receive a transmission from the first wearable device 102 comprising geolocation information 126 corresponding to the first wearable device 102 and a search query 128, wherein the search query 128 comprises a keyword. The server 106 may be operable to determine one or more entities (for example, the first entity 110) within a distance threshold from the first wearable device 102 based, at least in part, on the geolocation information 126 and the search query 128. Determining the one or more entities within the distance threshold comprises of identifying one or more instances of the keyword within entity file information 120 associated with the one or more entities and stored in the server 106. The server 106 may then generate an entity vector 130 comprising the determined one or more entities within the distance threshold of the first wearable device 102; sort the one or more entities within the entity vector 130 based on a value of a distance from the first wearable device 102; and send a transmission to the first wearable device 102 comprising the entity vector 130. For example, the entity vector 130 may be sorted from the entities closest to the first wearable device 102 to those furthest away in descending order. In one embodiment, the first user 108 may input a string of text as a search query (i.e., search query 128) into the first wearable device 102 to locate an entity associated with a specific product, such as a coffee shop. In this example, the first user 108 may input "coffee," "coffee shop," "coffee shop locations," and the like into the first wearable device 102, wherein the keyword may be "coffee". The first wearable device 102 may transmit the search query 128 as well as geolocation information 126 associated with the first wearable device 102 to the server 106, where the server 106 may be operable to determine entities associated with the keyword "coffee" within a distance threshold from the location of the first wearable device 102. For example, the server 106 may produce a listing of nearby stores (i.e., the entity vector 130), that includes particular brand name coffee shops that are associated with the keyword "coffee", within a five mile radius from the first wearable device 102.

In another embodiment, the server 106 may be operable to determine, from user file information 132 associated with the first user 108 stored in the server 106, an item configured to affect an interaction between the first user 108 and the first entity 110 based on the received entity file information 120 (for example, a discount, coupon, program reward, and the like). The server 106 may be operable to send a transmission to the first wearable device 102 requesting authorization to enable the determined item and receive a response signal from the first wearable device 102 that either authorizes or does not authorize enablement of the determined item. In one embodiment, the server 106 may identify that the first user 108 is located at a specific location, such as at a coffee shop, based on the received entity file information 120 from the first wearable device 102. The server 106 may further identify that the user file information 132 associated with the first user 108 comprises an item, such as a 15% discount, applicable to any purchases made at that particular coffee shop. The first user 108 may be unaware that the user is pre-qualified to take advantage of the 15% discount, and the server 106 may be operable to request authorization to enable the 15% discount before the first user 108 conducts an interaction at that coffee shop, such as purchasing a cup of coffee.

The first user 108 may wear the first wearable device 102. In the illustrated example, first wearable device 102 is configured as a head-mounted wearable device. Other examples of wearable devices may be integrated into an eyeglass structure, contact lenses or other eyewear structure, a visor structure, a helmet structure, or any other suitable vision-based display structure. In some embodiments, first wearable device 102 may be or may be integrated with a mobile device. First wearable device 102 is described in more detail below in FIG. 2.

The first entity device 104 may be any suitable device for initiating an interaction. For example, first entity device 104 may be a register, a tablet, a phone, a laptop, a personal computer, a terminal, a kiosk, etc. The first entity device 104 may be operable to receive information from a user and/or card when an interaction is requested. The first entity device 104 then may proceed to process the requested interaction. The first entity device 104 may include any appropriate device for communicating with components of system 100 over the communication network 112. As an example and not by way of limitation, first entity device 104 may include a computer, a laptop, a wireless or cellular telephone, an electronic notebook, a personal digital assistant, a tablet, or any other device capable of receiving, processing, storing, and/or communicating information with other components of system 100. This disclosure contemplates first entity device 104 being any appropriate device for sending and receiving communications over communication network 112. The first entity device 104 may also include a user interface, such as a display, a microphone, keypad, or other appropriate terminal equipment usable by a user and/or the first entity 106. In some embodiments, an application executed by first entity device 104 may perform the functions described herein. As illustrated, the first entity device 104 may be associated with the first entity 110. The first entity 110 may be an individual or organization that provides goods or services to the first user 108 in exchange for resources.

The server 106 is generally a suitable server (e.g., including a physical server and/or virtual server) operable to store data in a memory 134 and/or provide access to application(s) or other services. The server 106 may be a backend server associated with a particular organization that facilitates conducting interactions between entities and one or more users. Details of the operations of the server 106 are described in conjunction with FIG. 3. Memory 134 includes software instructions that, when executed by a processor 136, cause the server 106 to perform one or more functions described herein. Memory 134 may be volatile or non-volatile and may comprise a read-only memory (ROM), random-access memory (RAM), ternary content-addressable memory (TCAM), dynamic random-access memory (DRAM), and static random-access memory (SRAM). Memory 134 may be implemented using one or more disks, tape drives, solid-state drives, and/or the like. Memory 134 is operable to store software instructions, the digital folder 118, the one or more utility indicators 114, the entity file information 120, the user file information 132, and/or any other data or instructions. The software instructions may comprise any suitable set of instructions, logic, rules, or code operable to execute the processor 136.

Digital folder 118 comprises a database of one or more items associated with the first user 108. For example, digital folder 118 may include one or more files 116, each comprising a digital representation of a card (e.g., credit card, debit card, etc.) or account, a loyalty card, a gift card, a rewards card, driver's identification card, insurance card, transit pass, event ticket, boarding pass, etc. Thus, in one embodiment, the digital folder 118 may be a digital wallet or the like. A digital representation of a card may include information such as bank information, address for interactions, shipping address, credit card number, expiration date, security numbers, personal identification number, member number, reward points, balance, etc. In embodiments, one or more of the items may be used for an electronic interaction. For example, a credit card, a gift card, and a rewards card may all be used for an electronic interaction, such as an interaction for goods or services. Digital folder 118 may comprise a control component (e.g., control software) and a data component (e.g., database of items). The control component may provide security and encryption for the data component and for external communications with other systems, such as electronic interaction systems, or other devices, such as first user device 102. Digital folder 118 may be stored in memory 134 of the server 106. First user 108 may possess a user device, such as the first wearable device 102, configured to access the digital folder 118.

For example, the server 106 may be a database operable to receive a transmission from the first wearable device 102 comprising entity file information 120 associated with the first entity 110. In further embodiments, entity file information 120 for a plurality of entities may be stored in the memory 134 for further operations by the processor 136. Once the server 106 receives the transmission from the first wearable device 102, the processor 136, associated with the server 106, may determine which one of one or more files 116 is associated with a greater number of one or more utility indicators 114 than a remaining one or more files 116 based on the received entity file information 120. If there is not one of the one or more files 116 associated with a greater number of one or more utility indicators 114, but at least two files 116 are associated with an equivalent number of one or more utility indicators 114, the processor 136 may determine and compare the values of the one or more utility indicators 114 of the at least two files 116.

In this example, the one or more utility indicators 114 are items affecting an interaction between the first user 108 and the first entity 110 (for example, discounts, rewards, perks, and the like). Without limitations, the one or more utility indicators 114 may include travel points, a percentage of value back, coupons, discounts provided by an entity, or any combinations thereof. For example, the first user 108 may be conducting an interaction with the first entity 110, wherein the first entity 110 is a grocery store. The server 106 may be operable to recognize that the first entity 110 is a grocery store based on the received entity file information 120 from the first wearable device 102. In this example, a first one of the one or more files 116 may be associated with a utility indicator 114 of 1.5% value back on all interactions and another utility indicator 114 of 3% value back on food/grocery interactions, and a second one of the one or more files 116 may be associated with a utility indicator 114 of 1% value back on all interactions. The server 106 may be operable to determine that the first user 108 should use the first one of the one or more files 116 within the digital folder 118 as the first file 116 is associated with a greater number of utility indicators 114. In these examples, the processor 136 may be communicatively coupled to the memory 134 and may access the memory 134 for these determinations.

The user file information 132 may comprise a listing of one or more optional items to be authorized by the user associated with the user file information, such as the first user 108. In embodiments, the one or more optional items may be discounts for interactions with one or more entities. For example, the user file information 132 may include a 10% discount for a coffee chain, 5% discount for a clothing store, 15% discount for a store providing food, and the like.

Processor 136 comprises one or more processors operably coupled to the memory 134. The processor 136 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 136 may be a programmable logic device, a microcontroller, a microprocessor, or any suitable combination of the preceding. The one or more processors are configured to process data and may be implemented in hardware or software. For example, the processor 136 may be 8-bit, 16-bit, 32-bit, 64-bit, or of any other suitable architecture. The processor 136 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions. In this way, processor 136 may be a special-purpose computer designed to implement the functions disclosed herein. In an embodiment, the processor 136 is implemented using logic units, FPGAs, ASICs, DSPs, or any other suitable hardware. The processor 136 is configured to operate as described in FIGS. 1 and 3. For example, the processor 136 may be configured to perform the steps of method 300 as described in FIG. 3.

As illustrated, the server 106 may further comprise a network interface 138. Network interface 138 is configured to enable wired and/or wireless communications (e.g., via communication network 112). The network interface 138 is configured to communicate data between the server 106 and other devices (e.g., first wearable device 102), databases, systems, or domain(s). For example, the network interface 138 may comprise a WIFI interface, a local area network (LAN) interface, a wide area network (WAN) interface, a modem, a switch, or a router. The processor 136 is configured to send and receive data using the network interface 138. The network interface 138 may be configured to use any suitable type of communication protocol as would be appreciated by one of ordinary skill in the art.

The communication network 112 may facilitate communication within the system 100. This disclosure contemplates the communication network 112 being any suitable network operable to facilitate communication between the first wearable device 102 and the server 106. Communication network 112 may include any interconnecting system capable of transmitting audio, video, signals, data, messages, or any combination of the preceding. Communication network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

Example Wearable Device

FIG. 2 is a block diagram of an embodiment of the first wearable device 102 used by the system of FIG. 1. First wearable device 102 may be configured to overlay at least a portion of the contents of digital folder 118 (referring to FIG. 1) within a field of view of the first user 108 (referring to FIG. 1), capture biometric information of the first user 108 wearing the first wearable device 102, and to facilitate an electronic interaction between the first user 108 and the first entity 110 (referring to FIG. 1). An example of the first wearable device 102 in operation is described in FIG. 3.

First wearable device 102 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First wearable device 102 may be configured as shown or in any other suitable configuration. For example, first wearable device 102 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 106 in FIG. 1).

The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture (e.g., identify selected files 116 in FIG. 1), capture biometric information of a user, such as first user 108, via one or more of camera 208, microphone 214, and/or biometric devices 218, and communicate via wireless communication interface 210 with server 106 and/or first entity device 104. In some embodiments, the function described herein is implemented using logic units, FPGAs, ASICs, DSPs, or any other suitable hardware or electronic circuitry.

The memory 204 is operable to store any of the information described with respect to FIGS. 1 and 3 along with any other data, instructions, logic, rules, or code operable to implement the function(s) described herein when executed by processor 202. For example, the memory 204 may store the instructions and logic rules 220, which are described below with respect to FIG. 3. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, at least a portion of the digital folder 118 (referring to FIG. 1), instructions for performing the functions of first wearable device 102 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 108 in FIG. 1) in an augmented reality environment that overlays virtual or graphical objects onto tangible objects in a real scene in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects overlaid onto tangible objects in a real scene in real-time.

Examples of camera 208 include, but are not limited to, charge-coupled device (CCD) cameras and complementary metal-oxide semiconductor (CMOS) cameras. Camera 208 is configured to capture images of a wearer of first wearable device 102, such as first user 108. Camera 208 may be configured to capture images continuously, at predetermined intervals, or on-demand. For example, camera 208 may be configured to receive a command from first user 108 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as first entity device 104 (referring to FIG. 1) or server 106 (referring to FIG. 1). Wireless communication interface 210 is configured to employ any suitable communication protocol.

The network interface 212 is configured to enable wired and/or wireless communications. The network interface 212 is configured to communicate data between the first wearable device 102 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g. voice signals or commands) from a user, such as first user 108. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 108, employing first wearable device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners.

Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Operation of the System for Query Processing of a Frequency of Utility Indicators FIG. 3 is a flow diagram illustrating an example method 300 of the system 100 of FIG. 1. The method 300 may be implemented using the first wearable device 102, the first entity device 104, and the server 106 of FIG. 1. The method 300 may begin at step 302 where the first user 108 (referring to FIG. 1) may input the search query 128 (referring to FIG. 1) into the first wearable device 102. In this example, the search query 128 may comprise one or more keywords associated with the types of goods or services provided by one or more entities. The first wearable device 102 may transmit the search query 128 and geolocation information 126 (referring to FIG. 1) associated with the first wearable device 102 to the server 106 through the communication network 112 (referring to FIG. 1). The processor 136 (referring to FIG. 1) of the server 106 may be operable to receive the transmission from the first wearable device 102 comprising the geolocation information 126 and the search query 128.

At step 304, the processor 136 of the server 106 may determine one or more entities within a distance threshold from the first wearable device 102 based, at least in part, on the geolocation information 126 and the search query 128. To determine the one or more entities within the distance threshold, the processor 136 may be operable to identify one or more instances of the keyword within entity file information 120 associated with the one or more entities that is stored in the memory 134 (referring to FIG. 1) of the server 106. In examples, the distance threshold may be set to an arbitrary value, such as one mile. The processor 136 may be limited in identifying the one or more entities within that one-mile distance threshold from the first wearable device 102.

At step 306, in response to determining one or more entities within the distance threshold from the first wearable device 102, the processor 136 of the server 106 may generate the entity vector 130 (referring to FIG. 1) comprising the determined one or more entities within the distance threshold of the first wearable device 102. Each of the one or more entities of the entity vector 130 may be associated with entity file information 120 comprising at least one instance of the keyword within the search query 128. For example, the keyword may be "coffee", and each of the one or more entities within the entity vector 130 may be associated with entity file information 120 indicating that that entity provides goods and/or services associated with "coffee". The processor 136 of the server 106 may sort the one or more entities within the entity vector 130 based on a value of a distance from the first wearable device 102. For example, the entity vector 130 may list the one or more entities in descending order from the entity closest in distance to the first wearable device 102 to the entity furthest away in distance from the first wearable device 102. The processor 136 of the server 106 may then send a transmission to the first wearable device 102 comprising the entity vector 130. The first wearable device 102 may be configured to display at least a portion of the received entity vector 130 on the display 206 (referring to FIG. 2) in a field of view of the first user 108.

The first user 108 may then select one of the one or more entities within the entity vector 130 to conduct an interaction with that entity. For example, the first user 108 may select the first entity 110 (referring to FIG. 1) and may then conduct an interaction with the first entity 110 via the first entity device 104. In alternate embodiments, the first user 108 may initially be at a location associated with the first entity 110 and may not have submitted a search query 128.

At step 308, the first wearable device 102 may receive entity file information 120 associated with the first entity 110 from the first entity device 104. The first wearable device 102 may communicatively couple to the first entity device 104 and establish a peer-to-peer connection with the first entity device 104 through near field communications (NFC), Bluetooth, Wi-Fi, or combinations thereof. In another embodiment, the first wearable device 102 may scan an identification item near the first entity device 104 to receive the entity file information 120 associated with the first entity 110, wherein the identification item is at least one of a barcode, a Quick Response (QR) code, a coded image, or a coded text. The first wearable device 102 may then transmit the entity file information 120 to the server 106, wherein the processor 136 of the server 106 may receive the entity file information 120.

At step 310, the processor 136 of the server 106 may access the digital folder 118 (referring to FIG. 1) stored in the memory 134 to determine which one or more files 116 (referring to FIG. 1) for the first user 108 to utilize in the interaction with the first entity 110. The processor 136 of the server 106 may generate the file vector 122 (referring to FIG. 1) comprising at least a portion of the one or more files 116 of the digital folder 118 based on an association with one or more utility indicators 114 (referring to FIG. 1). In these examples, the one or more utility indicators 114 are items affecting an interaction between the first user 108 and the first entity 110 (for example, discounts, rewards, perks, and the like). Without limitations, the one or more utility indicators 114 may include travel points, a percentage of value back, coupons, discounts provided by an entity, or any combinations thereof. The processor 136 of the server 106 may determine that one of the one or more files 116 within the file vector 122 corresponds to a greater number of the one or more utility indicators 114 than a remaining one or more files 116 based, at least in part, on the entity file information 120 and assign that determined one of the one or more files 116 as a first file within the file vector 120. The processor 136 may further send a transmission to the first wearable device 102 comprising the file vector 122 and the indication 124 (referring to FIG. 1) to utilize the first file in an interaction between the first user 108 and the first entity 110. The first wearable device 102 may be configured to display at least a portion of the received file vector 122 and indication 124 on the display 206 as a listing and/or graphical representation in a field of view of the first user 108.

At step 312, the processor 136 of the server 106 may determine, from user file information 132 (referring to FIG. 1) associated with the first user 108 stored in the memory 134, an item (for example, a discount, coupon, program reward, and the like) configured to affect an interaction between the first user 108 and the first entity 110 based on the received entity file information 120. In examples, the item may not be selected, authorized, or turned on within the user file information 132. The item may require authorization by the first user 108 to be enabled. The processor 136 of the server 106 may be operable to send a transmission to the first wearable device 102 requesting authorization to enable the determined item.

At step 314, the processor 136 of the server 106 may receive a response signal from the first wearable device 102 that either authorizes or does not authorize enablement of the determined item.

At step 316, the processor 136 of the server 106 may determine whether the received response signal from the first wearable device 102 either authorizes or does not authorize enablement of the determined item. If there is a determination that the received response signal does not authorize enablement of the determined item, the method 300 proceeds to end. Otherwise, the method 300 proceeds to step 318.

At step 318, in response to a determination that the received response signal does authorize enablement of the determined item, the processor 136 of the server 106 may be operable to select, turn on, or authorize enablement of the determined item. In examples, this enablement may occur prior to and affect an interaction between the first user 108 and the first entity 110. The method 300 then proceeds to end.

While several embodiments have been provided in this disclosure, it should be understood that the disclosed system and method might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for query processing of a frequency of utility indicators, comprising:
    a memory operable to store a digital folder associated with a first user, wherein the digital folder comprises a database of a plurality of files associated with the first user; and
    a processor operably coupled to the memory for analyzing or parsing through the plurality of files stored in the memory, configured to:
        receive a transmission from a first wearable device associated with the first user comprising entity file information associated with a first entity;
        generate a file vector comprising the plurality of files of the digital folder based on an association with one or more utility indicators;
        determine that one of the plurality of files within the file vector corresponds to a greater number of the one or more utility indicators than the remaining plurality of files based, at least in part, on the entity file information;
        assign the determined one of the plurality of files as a first file within the file vector;
        sort the plurality of files within the file vector based on a maximum value available to be received by the first user in an interaction between the first user and the first entity, wherein the first file is disposed in a first position within the file vector; and
        send a transmission comprising the sorted file vector and an indication to utilize the first file in the interaction between the first user and the first entity to the first wearable device.

2. The system of claim 1, wherein the processor is further configured to:
    receive a transmission from the first wearable device comprising geolocation information corresponding to the first wearable device and a search query, wherein the search query comprises a keyword; and
    determine one or more entities within a distance threshold from the first wearable device based, at least in part, on the geolocation information and the search query,
        wherein determining one or more entities within the distance threshold comprises identifying one or more instances of the keyword within entity file information associated with the one or more entities.

3. The system of claim 2, wherein the processor is further configured to:
    generate an entity vector comprising the determined one or more entities within the distance threshold of the first wearable device;
    sort the one or more entities within the entity vector based on a value of a distance from the first wearable device; and
    send a transmission to the first wearable device comprising the entity vector.

4. The system of claim 1, wherein the processor is further configured to:
    determine, from user file information associated with the first user stored in the memory, an item configured to affect the interaction between the first user and the first entity based on the received entity file information;
    send a transmission to the first wearable device requesting authorization to enable the determined item; and
    receive a response signal from the first wearable device that authorizes or does not authorize enablement of the determined item.

5. The system of claim 1, wherein the first wearable device is configured to use near-field communications to receive the entity file information from a first entity device associated with the first entity.

6. The system of claim 1, wherein the first wearable device is configured to scan an identification item to receive the entity file information associated with the first entity, wherein the identification item is at least one of a barcode, a Quick Response (QR) code, a coded image, or a coded text.

7. The system of claim 1, wherein the first wearable device is configured to:
    receive the transmission comprising the file vector and the indication to utilize the first file; and in response to receiving the transmission, display a graphical representation of the file vector in a field of view of the first user.

8. A method for query processing of a frequency of utility indicators, comprising:
receiving a transmission from a first wearable device associated with a first user comprising entity file information associated with a first entity;
generating a file vector comprising a plurality of files of a digital folder based on an association with one or more utility indicators;
determining that one of the plurality of files within the file vector corresponds to a greater number of the one or more utility indicators than the remaining plurality of files based, at least in part, on the entity file information;
in response to determining that one of the plurality of files within the file vector corresponds to a greater number of the one or more utility indicators than the remaining plurality of files based, at least in part, on the entity file information, assigning the determined one of the plurality of files as a first file within the file vector;
sorting the plurality of files within the file vector based on a maximum value available to be received by the first user in an interaction between the first user and the first entity, wherein the first file is disposed in a first position within the file vector; and
sending a transmission comprising the sorted file vector and an indication to utilize the first file in the interaction between the first user and the first entity to the first wearable device.

9. The method of claim 8, further comprising:
receiving a transmission from the first wearable device comprising geolocation information corresponding to the first wearable device and a search query, wherein the search query comprises a keyword; and
determining one or more entities within a distance threshold from the first wearable device based, at least in part, on the geolocation information and the search query, wherein determining one or more entities within the distance threshold comprises identifying one or more instances of the keyword within entity file information associated with the one or more entities.

10. The method of claim 9, further comprising:
generating an entity vector comprising the determined one or more entities within the distance threshold of the first wearable device;
sorting the one or more entities within the entity vector based on a value of a distance from the first wearable device; and
sending a transmission to the first wearable device comprising the entity vector.

11. The method of claim 10, further comprising:
receiving the transmission comprising the entity vector; and
displaying a graphical representation of the entity vector in a field of view of the first user.

12. The method of claim 8, further comprising:
determining, based on user file information associated with the first user, an item configured to affect the interaction between the first user and the first entity based on the received entity file information;
sending a transmission to the first wearable device requesting authorization to enable the determined item; and receiving a response signal from the first wearable device that authorizes or does not authorize enablement of the determined item.

13. The method of claim 8, wherein the first wearable device is configured to scan an identification item to receive the entity file information associated with the first entity, wherein the identification item is at least one of a barcode, a Quick Response (QR) code, a coded image, or a coded text.

14. The method of claim 8, wherein the first wearable device is configured to use near-field communications to receive the entity file information from a first entity device associated with the first entity.

15. The method of claim 8, further comprising:
receiving the transmission comprising the file vector and the indication to utilize the first file; and
in response to receiving the transmission, displaying a graphical representation of the file vector in a field of view of the first user.

16. A non-transitory computer-readable medium comprising instructions that are configured, when executed by a processor of a server, to:
receive a transmission from a first wearable device associated with a first user comprising entity file information associated with a first entity;
generate a file vector comprising a plurality of files of a digital folder based on an association with one or more utility indicators;
determine that one of the plurality of files within the file vector corresponds to a greater number of the one or more utility indicators than the remaining plurality of files based, at least in part, on the entity file information;
assign the determined one of the plurality of files as a first file within the file vector;
sort the plurality of files within the file vector based on a maximum value available to be received by the first user in an interaction between the first user and the first entity, wherein the first file is disposed in a first position within the file vector; and
send a transmission comprising the sorted file vector and an indication to utilize the first file in the interaction between the first user and the first entity to the first wearable device.

17. The non-transitory computer-readable medium of claim 16, wherein the instructions are further configured to:
receive a transmission from the first wearable device comprising geolocation information corresponding to the first wearable device and a search query, wherein the search query comprises a keyword; and
determine one or more entities within a distance threshold from the first wearable device based, at least in part, on the geolocation information and the search query, wherein determining one or more entities within the distance threshold comprises identifying one or more instances of the keyword within entity file information associated with the one or more entities.

18. The non-transitory computer-readable medium of claim 17, wherein the instructions are further configured to:
generate an entity vector comprising the determined one or more entities within the distance threshold of the first wearable device;
sort the one or more entities within the entity vector based on a value of a distance from the first wearable device; and
send a transmission to the first wearable device comprising the entity vector.

19. The non-transitory computer-readable medium of claim 16, wherein the instructions are further configured to:
- determine, from user file information associated with the first user, an item configured to affect the interaction between the first user and the first entity based on the received entity file information;
- send a transmission to the first wearable device requesting authorization to enable the determined item; and
- receive a response signal from the first wearable device that authorizes or does not authorize enablement of the determined item.

20. The non-transitory computer-readable medium of claim 19, wherein the instructions are further configured to:
- if the received response signal authorizes enablement of the determined item, instruct a memory operably coupled to the processor to store the received response signal authorizing enablement of the determined item and enable the determined item.

* * * * *